United States Patent [19]

Kraus et al.

[11] 4,397,507
[45] Aug. 9, 1983

[54] NOVEL PLASTIC CAGE FOR ROLLING BEARINGS

[75] Inventors: Gerhard Kraus, Herzogenaurach; Günther Schwarz, Höchstadt, both of Fed. Rep. of Germany

[73] Assignee: INA Walzlager Schaeffler KG, Herzogenaurach, Fed. Rep. of Germany

[21] Appl. No.: 303,618

[22] Filed: Sep. 18, 1981

[30] Foreign Application Priority Data

Nov. 6, 1980 [DE] Fed. Rep. of Germany ....... 3041860

[51] Int. Cl.³ .............................................. F16C 33/46
[52] U.S. Cl. .................................... 308/217; 308/201
[58] Field of Search ............... 308/217, 218, 201, 202, 308/207 R; 277/221, 220

[56] References Cited

U.S. PATENT DOCUMENTS

| 210,848 | 12/1878 | Gingras | 277/220 |
| 1,350,849 | 8/1920 | Stern | 277/221 |
| 3,261,612 | 7/1966 | Games | 277/221 |
| 4,239,304 | 12/1980 | Wakunami | 308/217 |

*Primary Examiner*—Lenard A. Footland
*Attorney, Agent, or Firm*—Hammond & Littell, Weissenberger and Muserlian

[57] ABSTRACT

A novel plastic cage for rolling bearings split at at least one point of its circumference, the abutting faces of the split ends being provided with mutually corresponding projections and depressions to form-lock the ends relative to each other radially and axially and for tangential fixation of the abutting faces of the split ends, one abutting face having integrally formed therewith at least one resilient tongue with a hook projection and the other abutting face being provided with a cooperating recess and a depression for the hooked projection.

3 Claims, 3 Drawing Figures

NOVEL PLASTIC CAGE FOR ROLLING BEARINGS

STATE OF THE ART

Plastic cages for rolling bearings split at at least one point of its circumference are known from German DE-OS No. 2,041,742, for instance and this type of cage has found broad application where axial mounting of the bearing cage is not possible which occurs in a variety of forms such as when the bearing is installed over a shaft collar, in crankshaft bearings, in injections, etc. Fixation of the cage ends relative to each other in axial and radial directions has a favorable effect on the performance of the cage, but under a tangential load applied to the circumference of the cage, the latter is not secured at its joint. In the case of segment cages having joints, the segments are pushed outward due to the centrifugal force and this causes the outer edges of the segments to come in contact with the outer race and to scrape off the existing lubrication film either partly or entirely. The behavior of the known cage is similar under tangential load and at high speeds of rotation and the resulting disadvantages of insufficient lubrication are well known.

OBJECTS OF THE INVENTION

It is a object of the invention to provide a novel cage with a fixation of the two abutting faces of the cage joint relative to each other in axial, radial and tangential directionswhile avoiding the disadvantages of known cages.

This and other objects and advantages of the invention will become obvious from the following detailed description.

THE INVENTION

The novel cage of the invention is comprised of a plastic cage for rolling bearings split at at least one point of its circumference, the abutting faces of the split ends being provided with mutually corresponding projections and depressions to form-lock the ends relative to each other radially and axially and for tangential fixation of the abutting faces of the split ends, one abutting face having integrally formed therewith at least one resilient tongue with a hook projection and the other abutting face being provided with a cooperating recess and a depression for the hooked projection.

The prior art problems are solved by the additional tangential fixation of the abutting faces of at least one resilient tongue with hook type projection as integrally formed on an abutting face, which tongue snaps into a corresponding recess in the other abutting face and having a depression for the hook type projection whereby a rolling bearing cage is created which can be used in the above mentioned installation instances and which has at the same time the advantages of a closed or non split cage.

In an advantageous embodiment of the invention, the recess is open toward at least one cage shell surface and the recess may be T-shaped with two resilient tongues engaging it. For such designs, the injection molds are relatively simple and therefore, the molding of the cage in an economical manner is ensured.

Referring now to the drawings.

Figure 1:
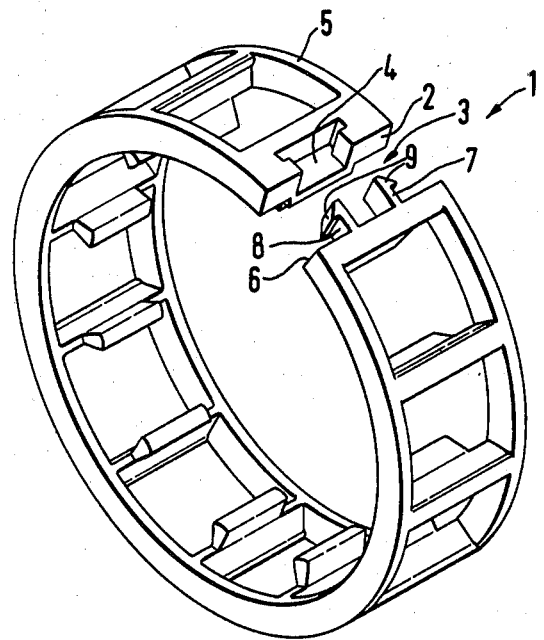
FIG. 1 is a perspective view of one complete embodiment of a cage of the invention.

In FIG. 1, complete cage 1 is provided with abutting face 2 of connection 3 having a T-shaped recess 4 which is open to outer surface 5. Abutting face 6 of connection 3 has integrally formed therewith 2 resilient tongues 7 and 8 having hook projections 9 which engage the T-shaped recess 4 of abutting face 2. In this fashion, the abutting faces 2 and 6 are secured against axial and tangential displacement.

Figure 2:
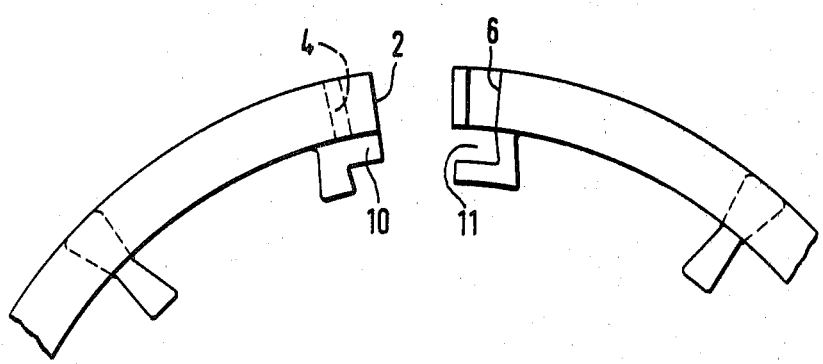
FIG. 2 is a partial cross-sectional side view of the embodiment of FIG. 1.

The protection of the abutting faces 2 and 6 against radial displacement is seen from FIG. 2 wherein radially inside recess 4 there is provided a integrally formed nose 10 which engages recess 11 radially inside the abutting face 6 to reliably prevent radial displacement of the cage ends relative to each other.

Figure 3:
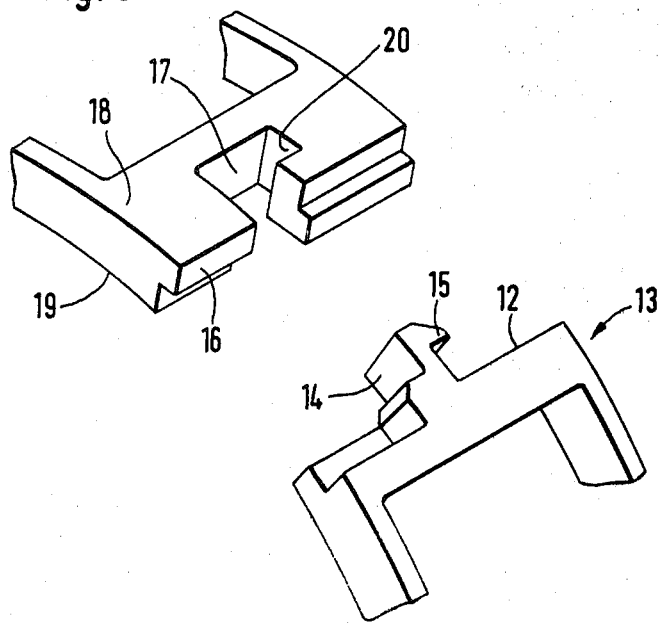
FIG. 3 is a partial perspective view of another embodiment for securing the split cage ends.

FIG. 3 illustrates a second possible connection of the split cage ends wherein abutting face 12 of cage 13 is provided with an integrally formed resilient tongue 14 having a hook projection 15. The second abutting face 16 is provided with a recess 17 open towards surfaces 18 and 19 with an integrally formed depression 20 as an axial continuation of recess 17. The snapping together of the cooperating said tongue and the recess provides a displacement-proof connection of the cage ends. The specific configuration of the resilient tongues and the cooperating recesses may vary in accordance with the specific type of cage and the desired tool-making equipment available.

Various modifications of the cage may be made without departing from the spirit or scope thereof and it is to be understood that the invention is intended to be limited only as defined in the appended claims.

What we claim is:

1. A plastic cage for rolling bearings split at least one point of its circumference, the abutting faces of the split ends being provided with mutually corresponding projections and depressions to form-lock the ends relative to each other radially and axially and for tangential fixation of the abutting faces of the split ends, one abutting face having integrally formed therewith at least one resilient tongue with a hook projection as one of said projections and the other abutting face being provided with a cooperating recess as a said depression and a depression for the hook projection.

2. A plastic cage of claim 1 wherein the recess extends over a portion of the cage width and is open towards one side surface and the depression cooperating with the hook projection is integrally formed as a axial continuation of the recess.

3. A plastic cage of claim 1 provided with two resilient tongues with hook projections cooperating with a T-shaped recess.

* * * * *